No. 893,002. PATENTED JULY 14, 1908.
F. MARTIN.
DUST SEPARATING APPARATUS.
APPLICATION FILED DEC. 7, 1905.
5 SHEETS—SHEET 3.
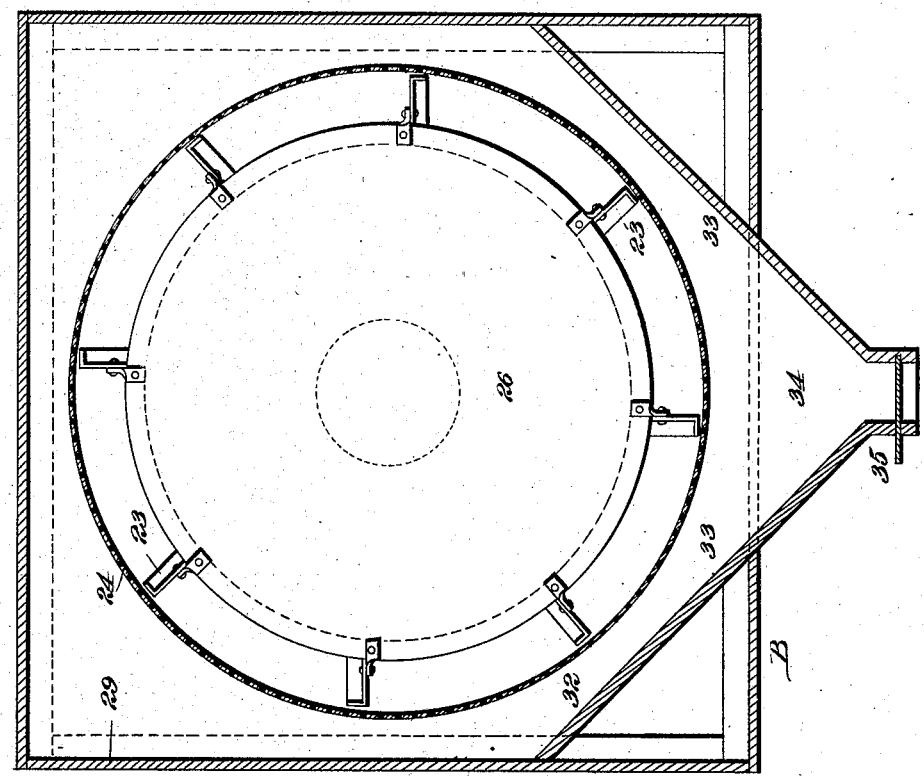
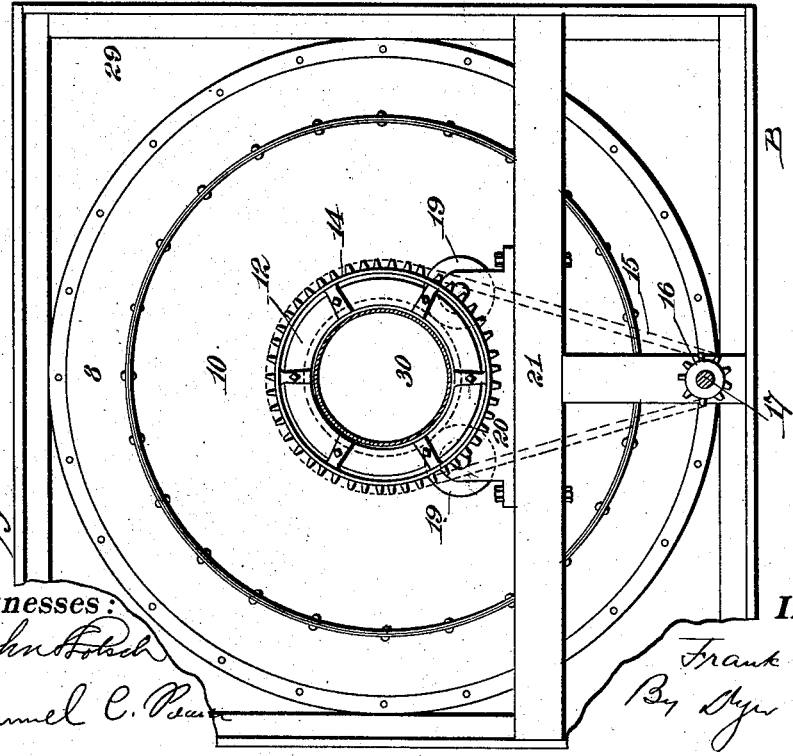
Witnesses:
Inventor
Frank Martin
By Dyer & Dyer
Attorneys.

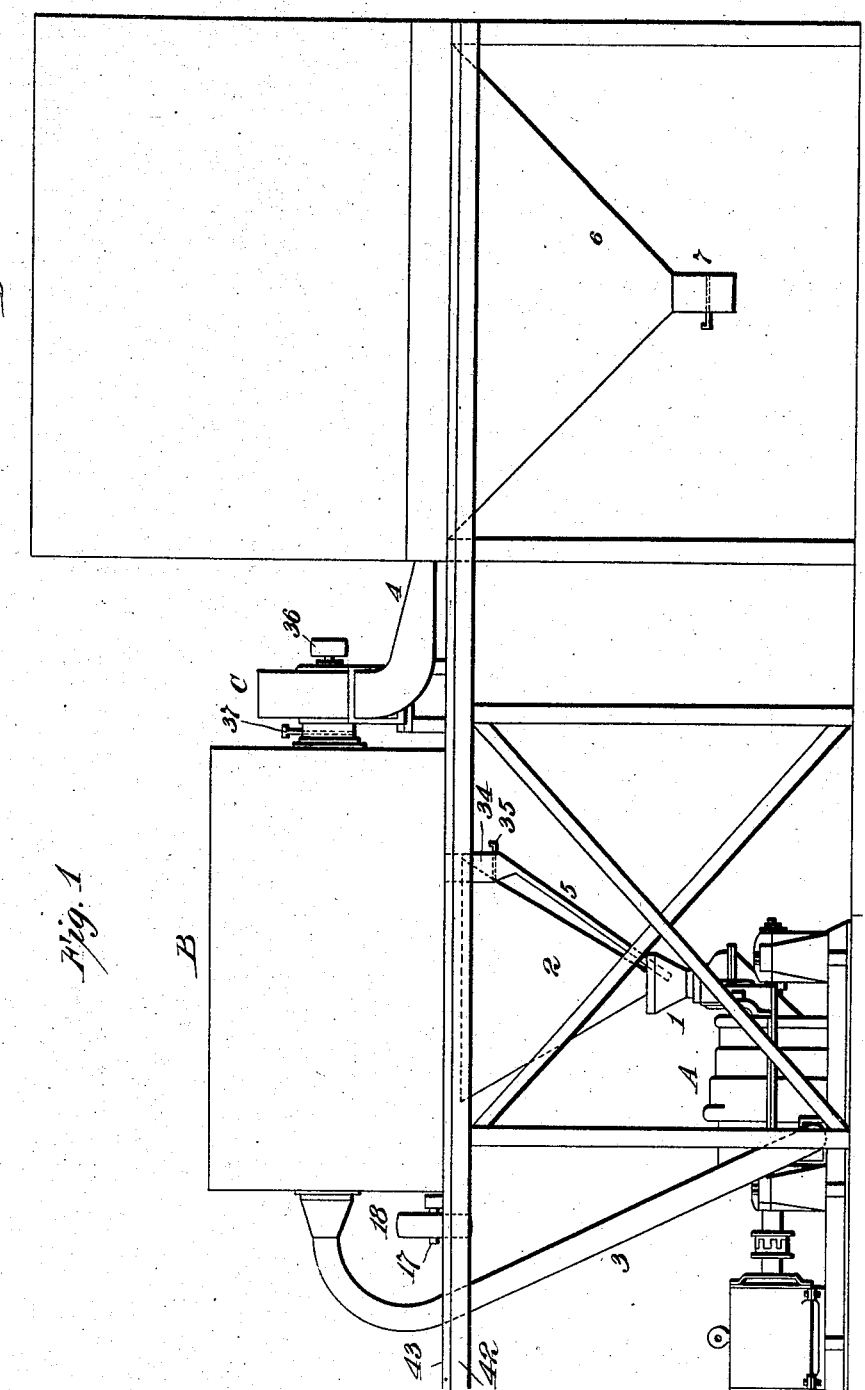

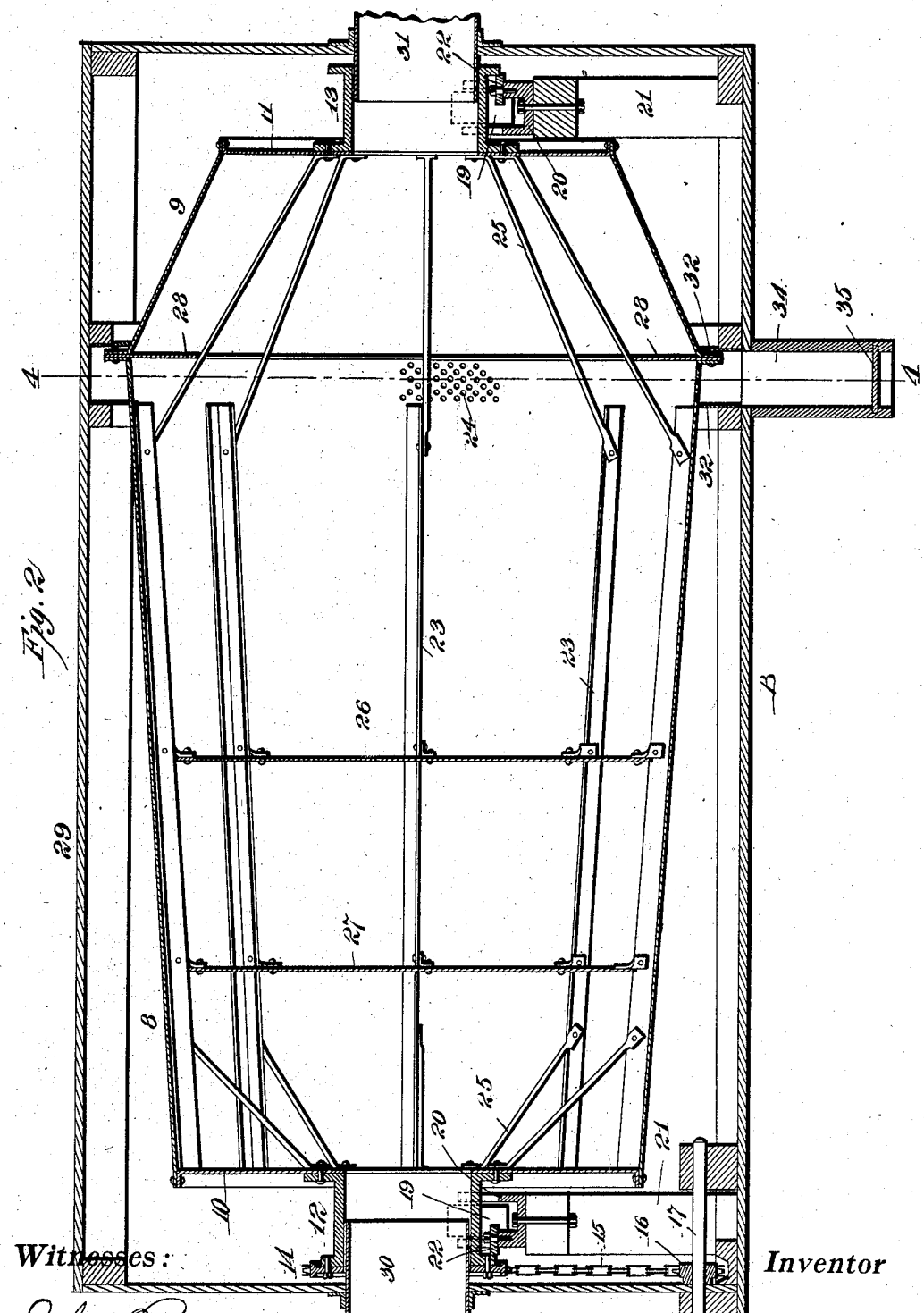

No. 893,002. PATENTED JULY 14, 1908.
F. MARTIN.
DUST SEPARATING APPARATUS.
APPLICATION FILED DEC. 7, 1905.
5 SHEETS—SHEET 4.
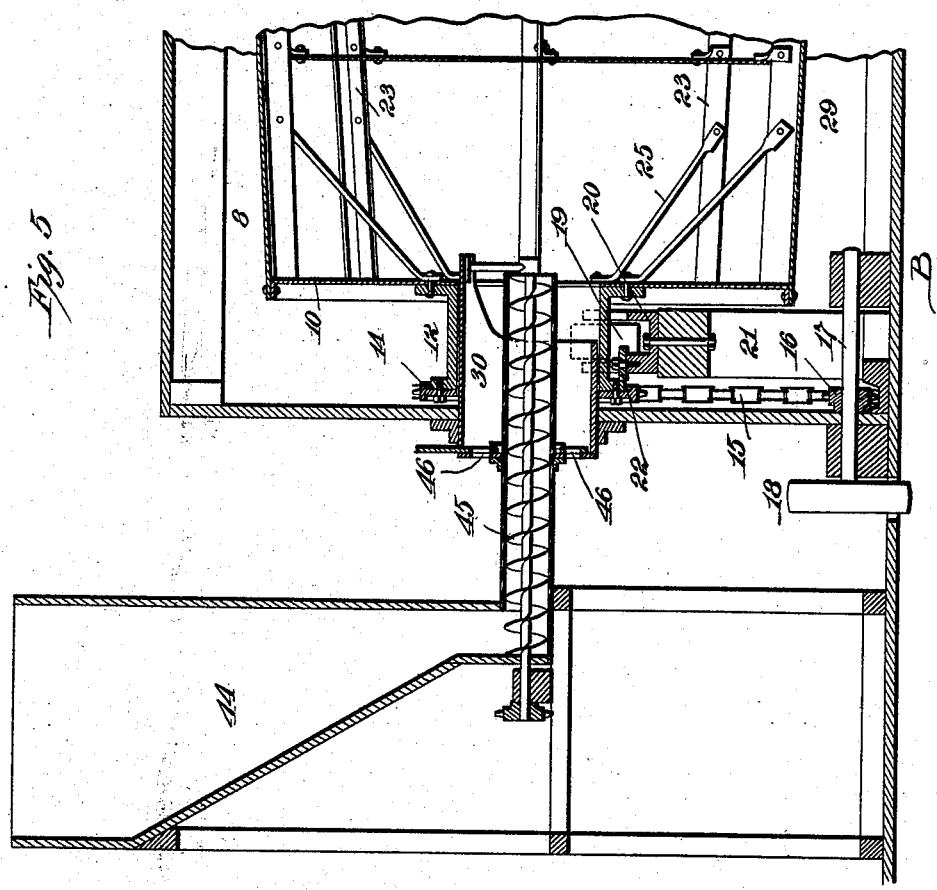
Witnesses: Inventor
Frank Martin
By Dyer & Dyer
Attorneys.

No. 893,002. PATENTED JULY 14, 1908.
F. MARTIN.
DUST SEPARATING APPARATUS.
APPLICATION FILED DEC. 7, 1905.
5 SHEETS—SHEET 5.
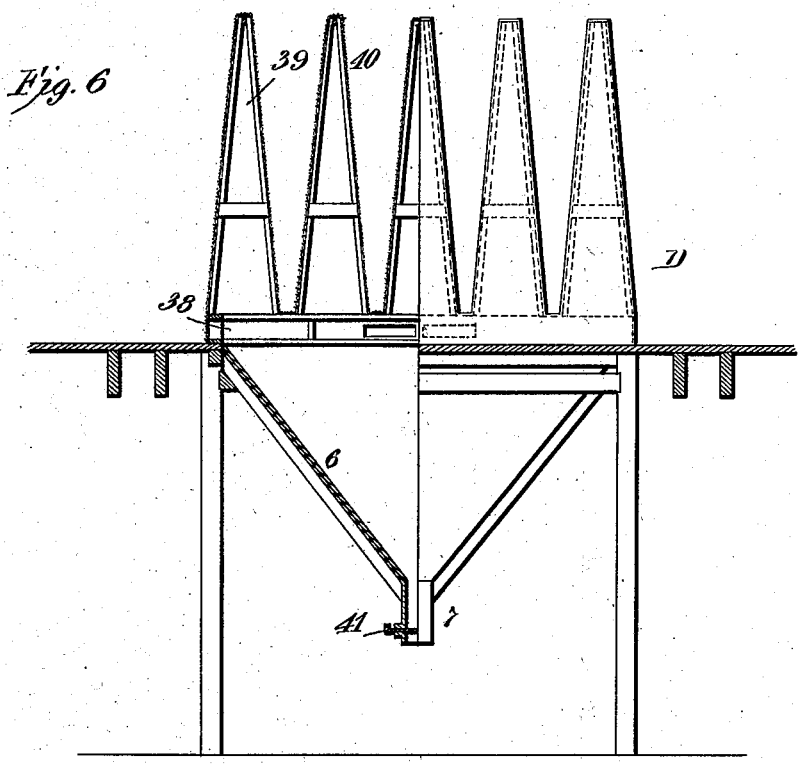
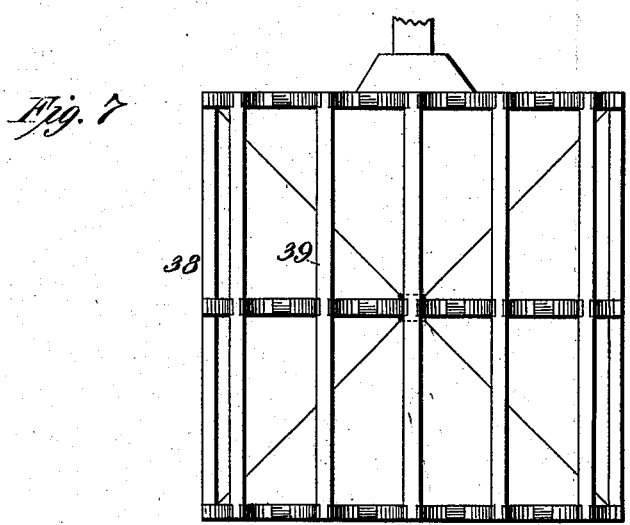
Witnesses: Inventor
Frank Martin
By Dyer & Dyer
Attorneys.

UNITED STATES PATENT OFFICE.

FRANK MARTIN, OF WORCESTER, MASSACHUSETTS, ASSIGNOR TO THE AERO PULVERIZER COMPANY, OF PORTLAND, MAINE, A CORPORATION OF MAINE.

DUST-SEPARATING APPARATUS.

No. 893,002.      Specification of Letters Patent.      Patented July 14, 1908.

Application filed December 7, 1905. Serial No. 290,686.

*To all whom it may concern:*

Be it known that I, FRANK MARTIN, a citizen of the United States, residing at Worcester, in the county of Worcester and State of Massachusetts, have invented a certain new and useful Improvement in Dust-Separating Apparatus, of which the following is a description.

The object I have in view is the production of a dust separating apparatus particularly designed for separating the dust from the coarser particles of ground or pulverized materials such as cement, coal, etc., the coarser particles being returned to the grinder or pulverizer for further reduction, which apparatus will be simple in construction and efficient in operation.

In the drawing, Figure 1 is an elevation representing the general arrangement of the apparatus; Fig. 2 is a longitudinal section of the dust separator; Fig. 3 is an end elevation of the dust separator at its receiving end with the end of the exterior casing removed; Fig. 4 is a section of the dust separator taken on line 4—4 in Fig. 2; Fig. 5 is a section of the feed end of the dust separator modified; Fig. 6 is an elevation and partial section of the settling chamber; and Fig. 7 is a top view of the settling chamber with the cloth covering removed.

Referring particularly to Fig. 1, A is the pulverizer, whose hopper 1 is connected with a large hopper 2 into which the material to be ground is dumped. The pulverized material mixed with air is delivered by a pipe 3 to the separator B. The dust is drawn out of the separator by an exhaust fan C, and is delivered through a duct 4 to the settling chamber D. The coarse material which is to be returned to the pulverizer is delivered from the separator B to the hopper 1 of the pulverizer by a pipe 5 whose lower end extends into the material in the hopper 1 and is air sealed thereby. The dust in the settling chamber D collects in the hopper bottom 6 of the chamber and is drawn off through the outlet 7.

Referring particularly to Figs. 2, 3 and 4, the separator consists of a long generally cylindrical sheet metal shell comprising two sections riveted together, the first or longer section 8 being slightly flaring from the inlet end, and the second or shorter section 9 being sharply tapered towards the exhaust end. The inlet end of the shell is closed by a sheet metal head 10, and the outlet end is closed by a similar head 11. Riveted to these heads are the cast iron hubs 12, 13, said hubs being provided with flanges at their inner ends to which the heads are secured and also with flanges at their outer ends. Bolted to the outer flange of the hub 12 is a sprocket wheel 14 which derives motion through a drive chain 15 from a sprocket pinion 16 mounted on a shaft 17 properly supported and connected with the line shafting or other source of power by means of a pulley 18 (Fig. 1). The separator is supported on roller bearings on which the hubs 12, 13 rest, each of such bearings consisting of a pair of rolls 19 carried in a saddle 20 supported on standards 21. The saddles 20 are also provided with horizontal thrust rollers 22 bearing against the outer flanges of the hubs to prevent longitudinal movement of the separator shell. Riveted to the interior of the section 8 of the separator shell is a series of longitudinal angle-irons 23 which serve to strengthen the shell and also act as vanes or lifting plates to elevate the pulverized material and shower it downwardly. These angle-irons extend from the head 10 to within a short distance of the larger end of the section 8, and that portion (24) of the shell 8 beyond the ends of the angle-irons is provided with openings or perforations, the size of which is sufficient to permit the passage outwardly through the shell of the largest particles of the ground material. Riveted to each of the heads 10 and 11 coincident with the inner flanges of the hubs 12 and 13 is a series of diagonal brace-rods 25 which extend from the heads to the angle-irons 23 and are riveted thereto. Located at about the longitudinal center of the section 8 of the separator shell is a diaphragm 26, and situated about midway between this diaphragm and the head 10 of the shell is a similar diaphragm 27. These diaphragms do not extend completely out to the shell, but are of a diameter sufficient to fill the bore of the shell within the projecting sides of the angle-irons 23, thus leaving an annular space between the outer edges of the diaphragms and the shell. The diaphragms 26, 27 are secured to the angle-irons 23 by means of brackets which are riveted to the diaphragms and to the angle-irons. Secured between the flanges where the sections 8 and 9 of the shell are joined is an annular diaphragm 28 which extends for a short distance inwardly towards the center of the chamber but leaving a considerable central opening therethrough. The separator is inclosed in a box or casing 29 which is made as tight as possible. In the heads of this casing 29 are secured the inlet pipe 30 and the outlet pipe 31 which project inwardly into the hubs 12 and 13 respectively. Within the casing 29 and surrounding the separator shell on opposite sides of the perforated zone 24 are partition plates 32 which with the inclines 33 form a hopper 34 for the reception of the tailings or coarse particles which pass out of the separator shell through the perforations 24. At the lower end of the hopper 34 is a slide or gate 35 for shutting off the discharge of the tailings, and extending from this hopper to the hopper 1 of the pulverizer is the return pipe 5 before referred to, by means of which the tailings are returned to the pulverizer to be reground. The exhaust pipe 31 of the separator communicates with the intake of the exhaust fan C driven by a pulley 36, a damper 37 (Fig. 1) being provided between the exhaust fan and the separator for the purpose of regulating the effect of the exhaust fan upon the material in the separator shell.

The dust is delivered by the exhaust fan through the duct 4 to the settling chamber D. This settling chamber consists of a rectangular base 38 of shallow depth and built of light framing, and mounted on top of said base is a series of A-shaped frames 39 which extend across the base, the whole forming a light skeleton structure. The sides and ends of the base, the inclined sides, ends and tops of the A frames, and the top of the base between the bases of the A frames are covered by a textile fabric 40, preferably Canton flannel, with the nap of the cloth on the inside of the chamber. To the bottom of the base 38 and forming the bottom of the settling chamber is the hopper 6 which terminates in the spout 7 from which the contents of the hopper may be withdrawn by opening the gate 41.

The separator B and settling chamber D may be elevated upon a frame or flooring 42, upon which may be placed a track 43 to enable cars with the material to be ground to be run over the hopper 2. The pulverizer A is located on a lower level, as illustrated in Fig. 1.

The operation of the apparatus is as follows: The hopper 2 having been filled with the material to be pulverized, the material is fed to the pulverizer, which together with the separator and the exhaust fan are given suitable speeds of rotation by the power. The exhausting force from the separator is regulated according to the fineness of the finished product required, but usually it is only slightly in excess of the air pressure delivered by the pulverizer. The separation of the material is done entirely by the air currents, and the more rapid their movement, the coarser will be the product carried to the settling chamber. The dust-laden air as it enters the separator from the pulverizer has its momentum arrested by impingement against the face of the first diaphragm or baffle plate 27, and is so expanded and rarefied in the chamber following the diaphragm 27 that the finer particles of the material readily separate from the coarser ones. The particles sufficiently fine to be air borne pass on to the exhaust fan and from there to the settling chamber. The coarser particles that resist the air currents fall to the bottom of the separator and are gradually fed along its downwardly inclined surface to the perforated zone 24, where they escape into the hopper 34 and are returned to the pulverizer for further reduction. The larger particles which are not projected to the bottom of the shell by the diaphragm 27 are arrested by the diaphragm 26. The longitudinal angle-irons 23 lift the material during the revolution of the separator and shower it downwardly again, thus assisting the separation of the dust from the coarser material due to the winnowing action so caused. The dust passing into the settling chamber D settles and accumulates in the hopper 6, the air passing outwardly through the extended cloth-covered surface of the settling chamber.

Where the material is ground or pulverized by a pulverizer which does not deliver the material mixed with air, the modification illustrated in Fig. 5 may be employed, in which the ground material is delivered to a hopper 44 at the receiving end of the separator, and is fed into the separator in properly regulated quantities by means of a screw-feed 45 passing centrally through the inlet pipe 30 of the separator. To supply a proper admixture of air, air openings 46, whose size is regulated by means of one or more dampers, are provided in the end of the pipe 30 around the screw-feed. In operating the dust separator in this manner, the exhaust fan at the outlet of the separator should be arranged to give a somewhat higher pressure than when the ground material is delivered to the separator mixed with air.

What I claim is:

1. In a dust separator, the combination with a horizontally arranged revolving shell having imperforate sides, of means for passing an air current and a dust mixture longitudinally through said shell together and in the same direction, one or more baffle plates for arresting the coarser particles and throwing them to the sides of the shell, and a discharge for the coarser particles through the sides of the shell at one end, substantially as set forth.

2. In a dust separator, the combination with a horizontally arranged revolving shell having imperforate sides, of means for passing an air current and a dust mixture longitudinally through said shell together and in the same direction, one or more baffle plates for arresting the coarser particles and throwing them to the sides of the shell, vanes carried by the shell for lifting and showering the material thrown to the sides of the shell, and a discharge for the coarser particles through the sides of the shell at one end, substantially as set forth.

3. In a dust separator, the combination with a horizontally arranged revolving shell having imperforate sides formed of two sections flared outwardly from the ends of the shell, of means for passing an air current and a dust mixture longitudinally through said shell together and in the same direction, baffle plates for arresting the coarser particles and throwing them to the sides of the shell, vanes carried by the shell for lifting and showering the material thrown to the sides of the shell, and a discharge for the coarser particles in the sides of the shell at the point of its greatest diameter, substantially as set forth.

4. In a dust separator, the combination with a horizontally arranged revolving cylinder having imperforate sides and provided with baffling and lifting plates and a discharge for the coarser particles in its sides at one end, of tubular hubs at the ends of the cylinder, a tight casing inclosing the sides and ends of the cylinder, inlet and outlet pipes supported by the casing and entering the tubular hubs of the cylinder, and means for passing an air current and a dust mixture longitudinally through said cylinder together and in the same direction, substantially as set forth.

This specification signed and witnessed this sixth day of December, 1905.

FRANK MARTIN.

Witnesses:
 AUG. LONG,
 JOHN L. LOTSCH.